UNITED STATES PATENT OFFICE.

ALFRED L. RICE AND GEORGE M. RICE, 2D, OF WORCESTER, MASSACHUSETTS.

PROCESS OF SEPARATING WOOL FROM SILK.

SPECIFICATION forming part of Letters Patent No. 546,434, dated September 17, 1895.

Application filed September 21, 1894. Serial No. 523,689. (Specimens.)

*To all whom it may concern:*

Be it known that we, ALFRED L. RICE and GEORGE M. RICE, 2d, citizens of the United States, residing at Worcester, in the county of Worcester and State of Massachusetts, have invented a new and useful Improvement in the Art of Separating Wool and Similar Fibers from Silk Fibers, of which the following, together with the accompanying drawings, is a specification sufficiently full, clear, and exact to enable persons skilled in the art to which this invention appertains to make and use the same.

The object of our invention is to afford a practical and economical process for treating wool stock, rags, mill-waste, cloth-cuttings, or similar materials containing silk threads or silk fibers mixed therewith, or mixtures of wool stock, vegetable fiber, and silk fiber, for the separation and recovery of the wool or worsted fiber free from silk or in suitable condition to be worked into fabrics requiring a clear all-wool fiber for their production.

Our invention is based on the discovery that the application of live steam at low tension to the fiber of silk contained in mixed stock, such as above named, which has been previously subjected to the chemical action of hydrochloric acid, chlorine, or chlorine compounds capable of furnishing hydrochloric acid or chlorine for carbonization of vegetable fibers, and the steam action continued in confined direct association with the fiber thus impregnated with such chemical agent, will effect destruction or disintegration of the silk fibers without material injury to wool fibers mixed therewith.

In carrying out our improved process in the treatment of mixed stock or material for the recovery of wool, worsted, or hair and freeing the same from silk the stock to be treated is massed in convenient quantity for treatment within a suitable container, which container may be a revoluble cylinder, such as heretofore employed in treating rags and wool stock, or any receptacle that will properly inclose the mass and confine the stock, together with the chemicals, gases, or fumes which are applied thereto. The primary step in the process consists in subjecting the stock to the action of hydrochloric acid, chlorine, or some chlorine compound which can be applied, as hydrochloric-acid gas, chlorine gas, or gases generated from chlorides, as sulphuric acid with salt, or any of the alkaline or metallic chlorides. The chemical agent may be brought into contact with the material in any suitable way, as we do not wish to confine our invention to any particular means or form of apparatus for working or applying the chemicals. For instance, one practicable method is to introduce such chemical agent in the form of gas into the container from a generator through a pipe connecting therewith; or in other instances it may be formed within the container by introducing a mass of dust or fine granular inert substance mixed with hydrochloric acid, and then, by heat applied to the container generate the chemical vapor therefrom; or, again, in other instances an efficient method is to deliver upon the mass a blast of air containing the vapor of hydrochloric acid or chlorine gas, in each of these instances the container being heated to a temperature of some 300°, more or less, and the inherent moisture of the stock permitted to escape or blow off. The stock being subjected to this treatment for a period of thirty to sixty minutes, more or less, according to its requirements, (light-weight or open stock being acted on more readily than heavy-weight or densely-woven stock,) any vegetable fiber—such as cotton, linen, jute, &c.—becomes carbonized or destroyed; but the silk, although it is impregnated with the chemical agents employed, remains substantially intact and is not at this stage in a condition that will remove it from the wool. The treatment at this point has effected complete carbonization of the vegetable fiber and is similar to previous practiced methods; but as regards the silk fiber it is but a preliminary step. This preliminary treatment is, however, essential to the successful removal of the silk.

For the thorough disintegration or complete destruction of the silk fibers, in addition to the above chemical treatment, we subject the stock, having the vegetable fiber carbonized therein, as above described, and in its then dry condition, to the intimate contact and digestive action of steam at moderately-low tension, or saturated hot vapor of water, by forcing into the container a continued supply of saturated steam under a pressure slightly above the normal atmospheric pressure, meaning by steam at low tension steam in condition to maintain saturative action and heat upon the fiber at a degree of temperature at or near the point of condensation—that is, at a degree that will supply wetness by condensation upon the fiber—and at the same time maintain such vaporously-wetted stock approximately at the boiling-point, and so as to give a sweating or steaming action without liability of any drying effect. This application of steam is subsequent to the carbonization of the vegetable matter and must be made while the stock is impregnated with the hydrochloric acid, chlorine, or chlorine compounds. This saturative steaming action being continued for some thirty minutes, more or less, the silk becomes friable, disintegrated, or destroyed and is capable of being broken up by attrition or otherwise. The resultant action is to first convert the silk fiber partially to a substance analogous to gelatine, which substance is further digested by the continued action of the steam, so that the coherent properties in the silk fiber are destroyed and it becomes friable, or capable of being easily pulverized. The stock is then removed from the container, and by subsequently passing it through a duster and then washing it the disintegrated silk fiber is carried away, together with the primarily-carbonized vegetable fibers mixed therewith, leaving the wool entirely free from silk and other fibers or substances. If in any instance desired, this practice can be modified by generating the steam directly within the container by the introduction thereto of a mass of dust or other agent moistened with or containing water and by elevated temperature of the container by applied heat sufficient to generate therefrom damp steam or hot vapor for acting upon the chemically-impregnated silk fibers. Drying of the stock after this latter treatment is not desirable before the washing operation. It will be understood that in this latter stage the heating of the container would be at a lower degree than that specified for the previous carbonizing action on the vegetable fiber.

The latter part of our process—the steaming action—can be performed upon the stock while inclosed within the same receptacle or container wherein the stock is subjected to the hydrochloric acid or chlorinating agent, but subsequent to the application of such chemicals; or, if in any instance it is deemed more convenient or desirable, the stock can be primarily treated with chemicals and then removed to a receptacle or closed container for undergoing the steaming or hot-vapor action therein.

In Letters Patent No. 205,139, No. 211,109, No. 235,622, and No. 235,170, heretofore granted us, we have described free chlorine, (Cl,) hydrochloric acid, and chlorine compounds as employed for separating animal fiber from vegetable fiber—such as cotton, flax, or jute—and it will therefore be understood that, broadly, the use of such agents is not herein claimed as the feature of our presnt invention; but such patented processes do not separate wool from silk fiber; and the essential feature of our process is treatment of the mixed stock or material with hydrochloric acid, chlorine, or chemicals furnishing chlorine, or chlorine compounds, together with an an additional subsequent treatment, as described, with steam or hot vapor while the material or silk fiber is impregnated with such acid, chlorine, or chemical agent.

What we claim as our invention, and desire to secure by Letters Patent, is—

1. In the art of separating fibers in mixed wool-stock containing silk, the process which consists in treating the mixed stock with hydrochloric acid, chlorine; or, chemicals furnishing chlorine or chlorine compounds; then releasing and driving off the inherent moisture therefrom until the stock is in super-dry condition and the carbonization of vegetable substances is complete; and then by subsequent treatment digesting the silk, while thus impregnated with such chemical agent, with steam at low tension applied in intimate contact with the fiber, and maintained substantially at the temperature and in condition of partial condensation as hot watery-vapor upon the material or silk fiber, for the purpose set forth.

2. In the art of separating wool fibers from silk in mixed wool-stock and similar material; the process of destroying silk fibers, which consists in primarily impregnating the material with a destructive chemical agent, as the gas of hydrochloric acid, chlorine, or chlorine compounds; then heating to complete carbonization of vegetable matter; then subjecting the mixed wool and silk fibers in intimate direct contact to continued action of live steam at low tension as hot saturating vapor thereon, while said material is confined and under pressure, as and for the purpose set forth.

3. In the art of separating wool fiber from silk in mixed wool-stock and similar material; the process which consists in treating the mass of mixed stock inclosed within a cylinder or container, by first impregnating the mass with gas generated from hydrochloric acid, chlorine; or a chlorine compound; then heating the same to a degree that effects complete carbonization of the vegetable fibers; and subsequently converting the silk fibers to gelatinous and friable condition by subjecting the same to hot watery-vapor generated from a substance of which water is a chief constituent.

Witness our hands this 20th day of September, A. D. 1894.

ALFRED L. RICE.
GEORGE M. RICE, 2D.

Witnesses:
CHAS. H. BURLEIGH,
ELLA P. BLENUS.